United States Patent Office 2,698,822
Patented Jan. 4, 1955

2,698,822

CARDIAC GLYCOSIDE BUCCAL COMPOSITION

Alfred Halpern and Clifford H. Bradney, New York, N. Y., assignors to E. Fougera & Co., Inc., New York, N. Y., a corporation of New York No Drawing. Application April 28, 1951, Serial No. 223,653

5 Claims. (Cl. 167—65)

This invention relates to solid compositions containing therapeutically active substances which, by themselves, are insoluble or difficultly soluble in water and it has particular relation to compositions of this type, in which said substances are present in combination with therapeutically inert ingredients in the form of a solid solution or composition, which can be dissolved in water or aqueous liquids.

The main object of this invention is to convert therapeutically active substances of the type described hereinafter, which are insoluble or difficultly soluble in water and/or aqueous fluids, into solid compositions which are soluble in water and aqueous fluids and in which said substances are present in combination with certain solubilizing agents of the type described hereinafter.

Another object of the present invention is to convert the before mentioned therapeutically active substances into solid tablets which are soluble in water and aqueous liquids and are suitable for use by administration and absorption through the buccal mucosa of the buccal cavity.

It is also an object of this invention to convert the before mentioned therapeutically active substances by means of inert ingredients into solid tablets, which are stable on storage and can be dissolved in water.

Other objects and the advantages of the invention will be apparent from the appended claims and the following specification which describes by way of example some embodiments of the invention.

It has been known that therapeutically active substances are administered by intravenous, oral and rectal routes. The most common method of administration is that by the oral route. This method is not satisfactory in the case of substances, which, such as, for example, the cardiac glycosides are irritants to the gastro-intestinal tract. It is well known that this local irritation of the gastro-intestinal tract seriously reduces the physiological response obtained by these agents.

Another point of consideration is the fact that there is a variable absorption from the gastro-intestinal tract which is due to the variable conditions found within the stomach and intestines, and the presence of various hydrolytic ferments, as well as the wide range of acidity and alkalinity present in the respective organs. Thus, for example, only 20% of a given dose of digitalis leaf, whether derived from digitalis purpurea or digitalis lanata, and only 10% of the purified glycoside, lanatasid C, is absorbed, upon oral administration.

According to the present invention, therapeutically active substances which are insoluble or difficultly soluble in water and/or aqueous liquids, are converted, by mixing them with compounds of the type described hereinafter, into solid compositions, which are capable of being tableted and, when placed in the form of tablets in a buccal cavity, for example in the sublingual space, form a fluid solution with the saliva. The solution thus formed is absorbed by the buccal mucosa, so that the active substances are released directly into the blood stream of the patient.

By virtue of the agents employed, said solid compositions or solid solutions are capable of being diluted with water or aqueous fluids, such as saliva, so that, in effect, solubilization of the normally insoluble or difficultly soluble active substances in the natural body fluids (blood and saliva) takes place. This solubilization promotes the passage of the normally insoluble or difficultly soluble substance through the mucosa and the obtaining of a full therapeutic effect.

The following examples describe, by way of example and without limitation, some embodiments of the invention.

*Example I*

100 milligrams of digitoxin are dissolved by homogeneous incorporation in 100 grams of molten warm polyoxyethylene glycol having an average molecular weight of about 4000, and the solution is allowed to cool to room temperature. After cooling, the solid material is pulverized, passed through a granulating machine and tableted in the usual manner, so that each tablet contains 0.2 milligrams of digitoxin.

By adjusting the weight of the tablet, or the concentration of active material, the dosage can be varied, for example tablets containing 0.1 or 0.4 milligrams of digitoxin, can be obtained.

*Example II*

100 milligrams of digitoxin are dissolved in 100 grams of warm, molten polyoxyethylene glycol having an average molecular weight of about 1000 and converted into tablets in the manner described in Example I.

*Example III*

100 milligrams of digitoxin are dissolved in 100 grams of warm, molten polyoxyethylene glycol having an average molecular weight of about 6000 and converted into tablets in the manner described in Example I.

*Example IV*

In carrying out the present invention, equivalent amounts of other cardiac glycosides or powdered digitalis leaf for extracts of plants containing cardiac glycosides, such as gitoxin, gitalin, lanatasid A, B and C, oleandrin, thevetin, scillaren, digoxin, strophantin, bufotoxin, which may be derived from plants or animals, can be partly or wholly substituted for digitoxin in the procedure described in Examples I, II and III.

In order to prepare compositions or solid solutions according to the present invention, an amount of about 100 miligrams of any of the before mentioned cardiac glycosides, or mixtures of said glycosides or mixtures of them with digitoxin, is dissolved in about 100 grams of a warm, molten polyoxyethylene glycol having an average molecular weight of from 1000 to 6000 and converted into tablets according to the procedure described in the above Example I.

*Example V*

100 milligrams of digitoxin are dissolved in 100 grams of a molten, warm polyoxyethylene glycol having an average molecular weight of from 1000 to 6000. To the composition thus formed, inert ingredients, such as lactose, talc, starch, magnesium stearate, sodium bicarbonate, wetting agents, and, if desired, other agents used in the art of tableting are added in conventional amounts, in order to adjust the hardness of the tablets and promote ease in the mechanical steps of tablet manufacture.

Such additions can be used also in tablets containing glycosides other than digitoxin.

*Example VI*

250 milligrams of 2-[(2-dimethyl aminoethyl) (p-methoxybenzyl) amino] pyridine (pyranisamine) are dissolved in 1500 milligrams of polyoxyethylene glycol having an average molecular weight of about 1500, with the aid of warming to 55°–65° C. The mixture solidifies upon cooling and is granulated and compressed into tablets suitable for buccal, for example sublingual, administration. By changing the above mentioned proportions, tablets with varying concentrations of active material can be obtained.

Therapeutically equivalent quantities of the following substances can be substituted for pyranisamine in this example:

2-(N-benzylanilinomethyl)-2-imidazoline (antazoline);
2-(benzohydryloxy)-N,N-dimethyl-ethylamine (diphenhydramine);

2-[α-(2-dimethylaminoethoxy)-α-methylbenzyl] pyridine (doxylamine);

2-[(2 - dimethylaminoethyl) - 2 - thenylamino] pyridine (methapyrilene);

1-phenyl-1-(2-pyridyl) - 3 - dimethylaminopropane (prophenpyridamine);

2-[(2-dimethylaminoethyl) (p-methoxybenzyl) amino] pyrimidine (thonzylamine);

2-[benzyl (2-dimethylaminoethyl)amino] pyridine(tripellenamine).

*Example VII*

1,000,000 units of procaine-penicillin G are dissolved in 1 gram of molten polyoxyethylene glycol having average molecular weight of about 1000. After cooling the solidified mass is granulated and compressed into tablets weighing approximately 100 milligrams each and having an average procaine penicillin G content of 100,000 units.

By suitable adjustment of the before mentioned proportions, tablets containing varying amounts of procaine penicillin G are obtained.

In a similar manner buccal tablets containing therapeutically equivalent amounts of other antibiotics, such as streptomycin, terramycin, aureomycin, chloromycetin, dihydrostreptomycin, can be obtained. For example, 1 gram of streptomycin, or 250 milligrams of teremycin, or 250 milligrams of aureomycin can be substituted for the procaine-penicillin G used in this example.

*Example VIII*

0.6 milligrams of glycerol trinitrate is dissolved with the aid of gentle heating in 100 to 150 milligrams of polyoxyethylene glycol having average molecular weight of about 4000. Upon cooling, a solid mass results which is formed to a tablet for sublingual or buccal use.

Therapeutically equivalent amounts of erythritol tetranitrate, or mannitol hexanitrate or inositol hexanitrate can be substituted for the glycerol trinitrate in this example.

*Example IX*

2000 milligrams of theophylline are dissolved in 2000 milligrams of polyoxyethylene glycol having an average molecular weight of about 4000, with the aid of warming to about 60°–65° C. After cooling, the composition thus obtained is granulated and compressed into tablets weighing about 400 milligram each, suitable for administration in the sublingual or buccal cavity.

Instead of theophylline, caffeine or theobromine can be used in this example.

The polyoxyethylene glycols used in carrying out this invention have an average molecular weight of from about 1000 to about 6000 and are inert, solid substances corresponding to the general chemical formula:

$$HOCH_2CH_2 (OCH_2CH_2)_n OH$$

These substances are stable products having no harmful or toxic effects and are capable of being compressed with conventional equipment into stable, solid tablets suitable for sublingual or buccal administration. The compositions embodying the invention are capable of being dissolved in water, for example in an equal amount of water, to give a clear solution.

It has been found that in most cases it is of advantage to use in practice, at least about 10 parts by weight of the solid polyoxyethylene glycol for 1 part by weight of the active substance to be solubilized. We prefer to use up to 1000 parts by weight of the solid polyoxyethylene glycol for 1 part by weight of the active substance to be solubilized.

It is often possible to produce solubilization of one part of the water-insoluble or difficultly water-soluble therapeutically active material in water by as little as one part of the solid polyoxyethylene glycol. However, the use of the above mentioned higher relative amounts of polyoxyethylene glycol is preferred, particularly as we have found it convenient to use the polyoxyethylene glycol alone as the vehicle for the active ingredient. It will be understood, however, that the invention includes also tablets, in which other ingredients, such as dyestuffs, lubricants, wetting agents, liquid polyoxyethylene glycols, or suitable amounts of other liquids, such as water or propylene glycol, and the like, are present, in addition to the solid polyoxyethylene glycol and the active ingredient or ingredients.

It will be understood that this invention is not limited to the specific materials, steps, polyoxyethylene glycols of the average molecular weights specifically mentioned above, and other specific details described above and can be carried out with various modifications without departing from the scope of the invention, as defined in the appended claims.

What is claimed is:

1. A solid shaped buccal composition containing a cardiac glycoside selected from the group consisting of digitoxin and digoxin normally sensitive to hydrolytic decomposition and a polyoxyethylene glycol having average molecular weight of from about 1000 to 6000, said composition being soluble in water and said polyoxyethylene glycol being effective to stablize said glycoside against decomposition on contact with saliva.

2. A solid shaped buccal composition, containing digitoxin and a polyoxyethylene glycol having average molecular weight of from about 1000 to 6000, said composition being soluble in water and said polyoxyethylene glycol being effective to stabilize said digitoxin against decomposition on contact with saliva.

3. A shaped buccal composition as claimed in claim 1 in which the polyoxyethylene glycol is present in an amount of at least 1–10 parts by weight for 1 part by weight of the cardiac glycoside.

4. A shaped buccal composition as claimed in claim 2 in which the polyoxyethylene glycol is present in an amount of at least 1–10 parts by weight for 1 part by weight of digitoxin.

5. A solid shaped buccal composition, containing digoxin and a polyoxyethylene glycol having average molecular weight of from about 1000 to 6000, said composition being soluble in water and said polyoxyethylene glycol being effective to stabilize said digoxin against decomposition on contact with saliva.

References Cited in the file of this patent

UNITED STATES PATENTS

| Number | Name | Date |
|---|---|---|
| 2,149,005 | Bockmuhl | Feb. 28, 1939 |
| 2,411,631 | Miescher | Nov. 26, 1946 |
| 2,540,253 | Gakenheimer | Feb. 6, 1951 |
| 2,544,272 | Miller | Mar. 6, 1951 |
| 2,600,344 | Van Meter | June 10, 1952 |

OTHER REFERENCES

"Carbowax," Jour. Amer. Pharm. Assn., Prac. Pharm. Ed., January 1949, pp. 30 to 32.

Middendorf: Medizin und Chemie, Verlag Chemie S. m. b. H., 1942, pp. 573 to 584.

"Carbowax Compounds and Polyethylene Glycols," Carbide and Chemicals Corp., June 1946, pp. 3 to 15.

U. S. Dispensatory, 24th ed., pp. 376 to 377 (1947).

Jour. of Clincal Endocrinology, vol. 9, pp. 382 to 384, April 1949.

Merck Index, 6th ed., N. J., 1952, p. 401.